(12) United States Patent
Jögel et al.

(10) Patent No.: US 12,085,436 B2
(45) Date of Patent: Sep. 10, 2024

(54) FIELD DEVICE WITH PROCESS-SPECIFIC CONDITION MONITORING CAPABILITY

(71) Applicant: Endress+Hauser Wetzer GmbH+Co. KG, Nesselwang (DE)

(72) Inventors: Thomas Jögel, Immenstadt (DE); Michael Schnalke, Nesselwang (DE); Björn Walser, Oberstaufen (DE); Kajetan Schneider, Immenstadt (DE); Fabian Schmölz, Rieden am Forggensee (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 141 days.

(21) Appl. No.: 17/296,386

(22) PCT Filed: Oct. 31, 2019

(86) PCT No.: PCT/EP2019/079882
§ 371 (c)(1),
(2) Date: May 24, 2021

(87) PCT Pub. No.: WO2020/104169
PCT Pub. Date: May 28, 2020

(65) Prior Publication Data
US 2022/0018699 A1   Jan. 20, 2022

(30) Foreign Application Priority Data
Nov. 23, 2018   (DE) ................ 10 2018 129 590

(51) Int. Cl.
G01F 15/06 (2022.01)
G01D 21/02 (2006.01)

(52) U.S. Cl.
CPC ........... *G01F 15/068* (2013.01); *G01D 21/02* (2013.01)

(58) Field of Classification Search
CPC .... G01F 15/068; G01F 15/065; G01F 15/061; G01F 15/06; G01D 21/02;
(Continued)

(56) References Cited

U.S. PATENT DOCUMENTS 9,915,375 B1   3/2018   Anderson
2002/0183864 A1* 12/2002 Apel .................. G06F 11/3013
700/19
(Continued)

FOREIGN PATENT DOCUMENTS

CN   103033686 A   4/2013
CN   108200773 A   6/2018
(Continued)

*Primary Examiner* — Lisa M Caputo
*Assistant Examiner* — Eric Sebastian Von Wald
(74) *Attorney, Agent, or Firm* — Mark A. Logan; Endress+Hauser (USA) Holding, Inc.

(57) ABSTRACT

The present invention relates to an apparatus for determining and/or monitoring at least one process variable of a medium, comprising a sensor unit for registering a value for the process variable, a time registration unit for registering at least one duration of operation and a calculating unit, which is embodied at least based on the duration of operation registered by the time registration unit and based on at least one influencing variable influencing the duration of operation to make at least one statement with reference to condition of at least one component of the apparatus. Furthermore, the present invention relates to a method for operating an apparatus of the invention.

9 Claims, 2 Drawing Sheets

(58) Field of Classification Search
CPC ........... G05B 2219/25428; G05B 2219/31211; G05B 2219/14045; G08B 25/018; G01L 19/149
See application file for complete search history.

(56) References Cited

U.S. PATENT DOCUMENTS

| | | | | |
|---|---|---|---|---|
| 2003/0132850 A1* | 7/2003 | Ozawa | ................... | F25D 17/02 |
| | | | | 700/282 |
| 2004/0183550 A1* | 9/2004 | Fehrenbach | ............ | G01F 23/14 |
| | | | | 324/662 |
| 2006/0155511 A1* | 7/2006 | Steinmueller | ........ | G01D 18/008 |
| | | | | 702/176 |
| 2007/0109143 A1* | 5/2007 | Klofer | ..................... | G01D 3/08 |
| | | | | 340/665 |
| 2008/0125884 A1* | 5/2008 | Schumacher | ...... | G05B 23/0286 |
| | | | | 700/79 |
| 2010/0063762 A1* | 3/2010 | Pechstein | ........... | G01N 27/4165 |
| | | | | 600/300 |
| 2010/0169816 A1* | 7/2010 | Hammer | ............ | G05B 19/0428 |
| | | | | 702/183 |
| 2010/0312491 A1* | 12/2010 | Lohmann | ........... | G05B 19/0426 |
| | | | | 702/31 |
| 2012/0029876 A1* | 2/2012 | Saitoh | ...................... | G01D 3/08 |
| | | | | 702/184 |
| 2014/0261791 A1 | 7/2014 | Grabau et al. | | |
| 2015/0007636 A1* | 1/2015 | Benkert | ............. | G01N 33/0009 |
| | | | | 73/53.01 |
| 2015/0120231 A1* | 4/2015 | Jagiella | .................. | G01D 18/00 |
| | | | | 702/91 |
| 2018/0196014 A1* | 7/2018 | Mann, III | ............... | G01N 29/12 |
| 2019/0017960 A1* | 1/2019 | Durm | .................. | G05B 19/0423 |

FOREIGN PATENT DOCUMENTS

| | | | | |
|---|---|---|---|---|
| DE | 10154482 A1 | 5/2003 | | |
| DE | 102005032134 A1 | 1/2007 | | |
| DE | 102006054421 A1 | 5/2008 | | |
| EP | 1442339 B1 | 3/2005 | | |
| EP | 2420908 A1 * | 2/2012 | .......... | G05B 19/0428 |
| JP | 2000075919 A | 3/2000 | | |
| JP | 20000075919 A | 3/2000 | | |

* cited by examiner

FIELD DEVICE WITH PROCESS-SPECIFIC CONDITION MONITORING CAPABILITY

CROSS-REFERENCE TO RELATED APPLICATIONS

The present application is related to and claims the priority benefit of German Patent Application No. 10 2018 129 590.1, filed on Nov. 23, 2018, and International Patent Application No. PCT/EP2019/079882, filed on Oct. 31, 2019, the entire contents of which are incorporated herein by reference.

TECHNICAL FIELD

The present invention relates to an apparatus for determining and/or monitoring at least one process variable of a medium as well as to a method for operating an apparatus of the invention.

BACKGROUND

Such field devices serve for monitoring and/or determining at least one, for example chemical or physical, process variable of a medium. In the context of the present invention, in principle, all measuring devices are referred to as field devices, which are applied near to a process and which deliver, or process, process relevant information, thus, also remote I/Os, radio adapters, and, generally, electronic components, which are arranged at the field level. A large number of such field devices are produced and sold by the Endress+Hauser group of companies.

For example, the field device can be a fill level measuring device, flow measuring device, pressure- and temperature measuring devices, pH- and/or pH-redox potential measuring device, and even a conductivity measuring device, which register corresponding process variables, fill level, flow, pressure, temperature, pH value, redox potential, and conductivity. The underlying measuring principles are sufficiently known in the state of the art and are not individually set forth here. In the case of flow measuring devices, such are, especially, Coriolis-, ultrasonic-, vortex-, thermal and/or magnetically inductive, flow measuring devices. Fill level measuring devices are, in turn, especially, microwave, fill level measuring devices, ultrasonic, fill level measuring devices, time domain reflectometric, fill level measuring devices (TDR), radiometric, fill level measuring devices, capacitive, fill level measuring devices, conductive, fill level measuring devices and/or temperature sensitive, fill level measuring devices. In the case of pressure measuring devices, in contrast, there are absolute-, relative- and difference pressure devices, while a temperature measuring device can utilize, for example, a thermocouple or a temperature dependent resistance for ascertaining temperature.

A field device includes at least one sensor unit coming at least partially and at least at times in contact with the process and an electronics unit, which serves, for example, for signal registration, -evaluation and/or -feeding. At least the electronics unit of a field device is typically arranged in a housing having an opening for introducing at least one connection cable into the field device.

In order to obtain information concerning the total operating time of a field device, field devices are often equipped with operating hours counters. In this way, for example, information can be won with reference to a possibly needed replacement of a field device in the process.

Field devices are exposed to the most varied of environmental- and/or process conditions during ongoing operation in a process. The particular surrounding conditions can, in this connection, have considerable influence on the lifetime of the particular measuring device, or individual components of the measuring device. A prognosis relative to a possible failure of a device made based on an operating hours counter can correspondingly be burdened with a large error.

SUMMARY

Therefore, an object of the present invention is to provide an opportunity for obtaining a more exact understanding of the condition of a field device in ongoing operation.

The object is achieved by an apparatus as defined in claim 1 as well as by a method as defined in claim 7.

With respect to apparatus, the object is achieved by an apparatus for determining and/or monitoring at least one process variable of a medium, comprising
 a sensor unit for registering a value for the process variable,
 a time registration unit for registering at least one duration of operation, and
 a calculating unit, which is embodied at least based on the duration of operation registered by the time registration unit and based on at least one influencing variable influencing the duration of operation to make at least one statement with reference to condition of at least one component of the apparatus.

The time registration unit can be, for example, an operating hours counter. In the case of conventional operating hours counters, as a rule, only a total-duration of operation of a field device is accumulated. The time information won by means of the operating hours counter contains no data concerning the particular process conditions, under which the particular field device was used. According to the invention, in contrast, in connection with a condition monitoring, thus, for ascertaining information with reference to condition of at least one component of the apparatus, at least one influencing variable is taken into consideration. Such influencing variables can have a considerable influence on the condition of the field device. The condition monitoring is, thus, not only based on the duration of operation ascertained by means of the time registration unit, but, also, takes into consideration the particular application of the apparatus. In this way, significantly more exact and more reliable information concerning condition can be obtained.

Advantageously, the influencing variable is a process parameter, a process variable or an environmental parameter, especially a temperature, especially a temperature of the process or of a component of the apparatus, a pressure, especially a pressure in a container, in which the medium is located, a moisture content, especially a humidity of the surroundings, vibrations, which occur in the region of the apparatus, flow of the medium, a pH value of the medium or a conductivity of the medium.

The particular process parameters, or process properties, of the medium and/or environmental parameters of the particular process significantly influence the condition of the utilized field device, especially the achievable lifetime. For example, operating the field device at too high temperatures, pressures or moisture contents can lead to a defect, and even to a total failure of the device or at least of individual components of the device.

In an embodiment, the apparatus includes a measuring unit for registering a value for the influencing variable, especially wherein the measuring unit is an apparatus for determining a temperature, a pressure, a moisture content, an apparatus for detecting vibrations, or for determining a flow, a pH value, or a conductivity. In this connection, it is, on the one hand, an option that the apparatus has a separate measuring unit for registering a value for the influencing variable. Depending on selected sensor unit, however, the sensor unit can also serve for registering a value for the influencing variable.

Other embodiments include, furthermore, that a value for the influencing variable is registered independently, or separately, of the apparatus, for example, by means of another field device or by means of another measuring unit.

A preferred embodiment provides that the apparatus includes at least first and second modules, wherein the calculating unit is embodied at least based on the duration of operation registered by the time registration unit and based on at least one influencing variable influencing the duration of operation to make at least a first statement with reference to condition of the first module of the apparatus and a second statement with reference to condition of the second module of the apparatus, or wherein two calculating units are present, wherein a first calculating unit is embodied to make the first statement with reference to condition of the first module, and wherein a second calculating unit is embodied to make the second statement with reference to condition of the second module.

In this way, it can be taken into consideration that some influencing variables have a greater influence than others on individual components, or that some influencing variables affect only individual components.

Advantageously in this connection, the first module is the sensor unit of the apparatus and/or the second module is an electronics unit of the apparatus. The electronics is, as a rule, arranged outside of the process, while the sensor unit is in many cases at least partially and/or at times in contact with the medium. There are both field devices of so-called compact construction, in the case of which the electronics unit is connected directly with the sensor unit, as well as also such, in the case of which the electronics unit is arranged separately from the sensor unit. Thus, different influencing variables influence different modules to different degrees. For example, frequently the electronics unit and the sensor unit of a field device are embodied for different maximum operating temperatures.

In an additional preferred embodiment, the apparatus includes a display unit for an, especially visual, display of the at least one statement with reference to condition of the component of the apparatus. In this connection, the most varied of display units can be used, for example, a display unit for displaying a graphical image, or one comprising a visual display element, for example, in the form of one or more, especially colored, LEDs.

The object underlying the invention is achieved, furthermore, by a method for operating an apparatus of the invention, wherein a value for the process variable is registered, a duration of operation is registered, and wherein at least based on the registered duration of operation and based on at least one influencing variable influencing the duration of operation at least one statement is made with reference to condition of at least one component of the apparatus.

In a preferred embodiment of the method, the statement with reference to condition of the at least one component of the apparatus is a process specific duration of operation of the at least one component of the apparatus. The process specific duration of operation takes into consideration besides the pure duration of operation the particular influence of the influencing variable. For certain ranges of the particular influencing variable, it can be expedient to limit a duration of operation, in order to avoid premature damaging of a component of the apparatus, or the total apparatus.

In an additional preferred embodiment, the statement with reference to condition of the at least one component of the apparatus is a probability for occurrence of a defect or a failure of the at least one component of the apparatus.

In another preferred embodiment of the method, the statement with reference to condition of the at least one component of the apparatus is a loading of the at least one component of the apparatus.

In the context of the present invention, one or more statements concerning condition of the apparatus can be made. For this, equal or even different influencing variables can be taken into consideration. The different statements can, furthermore, refer to different modules of the apparatus.

In the context of the method of the invention, it is, moreover, advantageous that a statement with reference to condition of an additional apparatus be made, an additional apparatus serving for monitoring the medium. Thus, also a condition monitoring of other field devices arranged in the process and exposed to the same process- and/or environmental conditions can occur.

In a preferred embodiment, at least first and second value ranges are predetermined for the influencing variable. Then especially a first value for the duration of operation of the apparatus corresponding to a value for the influencing variable within the first value range and a second value for the duration of operation of the apparatus corresponding to a value for the influencing variable within the second value range can be ascertained. According to the invention, at least two, preferably three, value ranges are predetermined. For different modules of the apparatus and/or for different influencing variables or combinations of at least two influencing variables, furthermore, different numbers of value ranges can be predetermined. The individual value ranges can, moreover, have equally large or differently large intervals for the one or more one influencing variables.

In this regard, statements with reference to at least one component of the apparatus are advantageously made for each of the at least two value ranges.

Alternatively, it is, however, likewise possible and advantageous to specify a weighting factor for at least one value range. Regarding the at least one weighting factor, it is, in turn, advantageous when the statement concerning the at least one component of the apparatus is made based on the at least two value ranges for the influencing variable and based on the at least one weighting factor.

It is to be noted that the embodiments described for the apparatus of the invention can be applied mutatis mutandis also for the method of the invention and vice versa.

BRIEF DESCRIPTION OF THE DRAWINGS

The invention as well as its advantageous embodiments will now be explained in greater detail with reference to FIG. 1-FIG. 4. The figures of the drawing show as follows.

Figure 1:
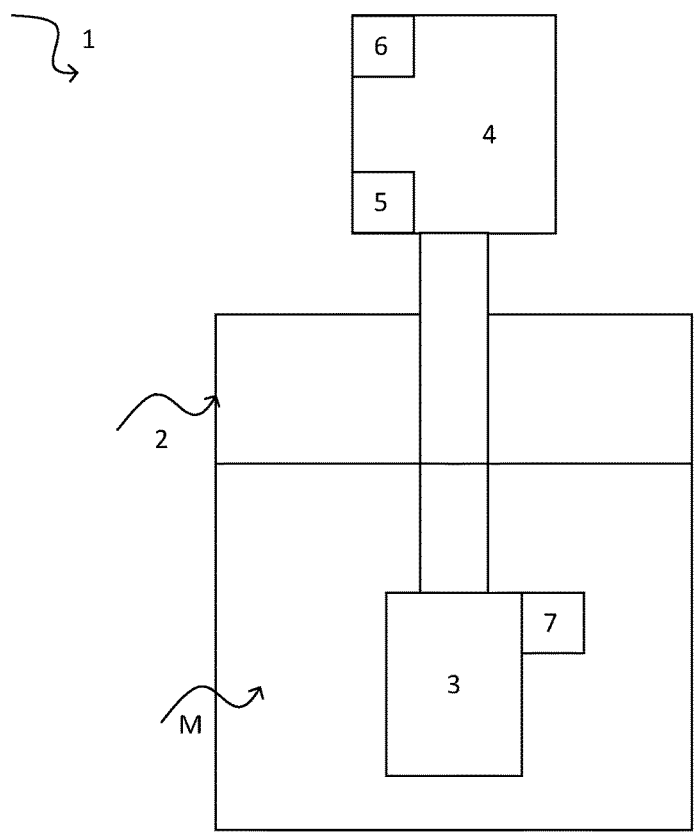
FIG. 1. shows a first embodiment of an apparatus of the present disclosure having a sensor unit, a time registration unit, a calculating unit and an additional measuring unit, FIG. 2. shows a second embodiment of an apparatus of the present disclosure with two calculating units as well as a display unit, FIG. 3. shows examples for the specification of different value ranges for an influencing variable, and FIG. 4. shows an apparatus of the present disclosure in the form of a thermometer with two modules.

In the figures, equal elements are provided with equal reference characters.

DETAILED DESCRIPTION

FIG. 1 shows a field device 1 for determining and/or monitoring at least one process variable P of a medium M, wherein the medium M is located in a container 2. Of course, a medium M in the context of the present invention can, however, also be located in some other kind of containment, for example, a pipeline, and even have no containment whatever.

The apparatus 1 includes a sensor unit 3 for registering a value for the particular process variable P as well as an electronics unit 4. Involved in the present example is a modular field device 1 of compact construction, wherein a first module is provided by the sensor unit 3 and a second module by the electronics unit 4. However, also other types of field devices fall within the scope of the present invention.

Arranged in the electronics unit 4 is a time registration unit 5 for registering at least one duration of operation t of the apparatus 1. Moreover, the electronics unit 4 includes a calculating unit 6. It is to be noted here that the time registration unit 5 and calculating unit 6 do not have to be arranged within electronics unit 4. They can as well also be arranged outside of the same.

The apparatus 1 additionally includes a measuring unit 7 for registering a value for the influencing variable IV. Such in the present example is arranged such as the sensor unit 3 such that it registers a process parameter p of the medium M. In other embodiments, the measuring unit 7 can also be embodied for determining an environmental parameter e, thus, a parameter outside of the medium M and/or container 2. The process parameter p is, for example, the temperature or the pressure of the medium. As described above, however, also other process parameters can be taken into consideration.

According to the invention, the calculating unit 6 is embodied based on the duration of operation t registered by the time registration unit 5 and based on at least the influencing variable IV influencing the duration of operation t to make at least one statement with reference to condition of the apparatus 1. This statement can be, for example, a process specific duration of operation $t_p$ of the apparatus 1, a probability for occurrence of a defect or a failure of the apparatus 1, or a loading of the apparatus.

Figure 2:
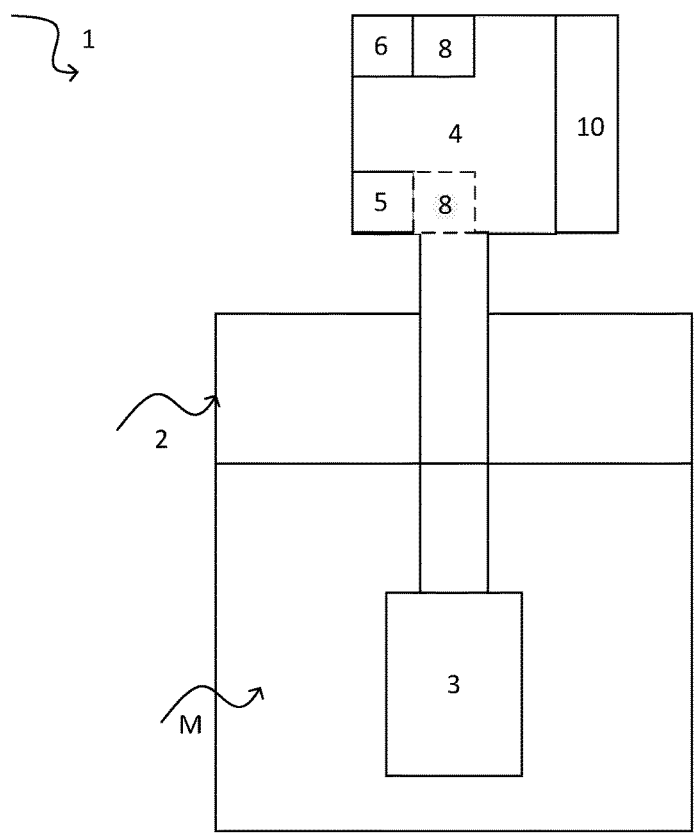

FIG. 2 shows a second possible embodiment for an apparatus 1 of the invention. In contrast with FIG. 1, this apparatus 1 includes a first calculating unit 6 and a second calculating unit 8. The first calculating unit 6 is so embodied at least based on the duration of operation t registered by the time registration unit 5 and the second calculating unit 8 is embodied based on at least one influencing variable IV the duration of operation t to make a first statement with reference to condition of the sensor unit 3 and a second statement with reference to condition of the electronics unit 4 of the apparatus 1. The first and second calculating unit 6, 8 can for ascertaining the first and second statements take into consideration the same influencing variable IV or different influencing variables IV1, IV2. In other embodiments, in turn, a plurality of statements, especially the two, concerning the electronics unit 4 and the sensor unit 3, can be ascertained by means of the same calculating unit 6. Also, each module 3, 4 can have its own time registration unit 5, 9 [the second time registration unit is drawn dashed].

Moreover, the apparatus 1 of FIG. 2 includes a display unit 10. This serves for the, especially visual, display of the at least one statement with reference to condition of the apparatus 1. For the embodiment shown here, the display unit 10 is likewise associated with the electronics unit 4. In other embodiments, the display unit can be a separate unit.

It is to be noted here that the individual components of the apparatuses of FIGS. 1 and 2 in other embodiments can also be combined with one another in other ways. The illustrated embodiments are, thus, to be considered only as individual, possible examples.

Figure 3:
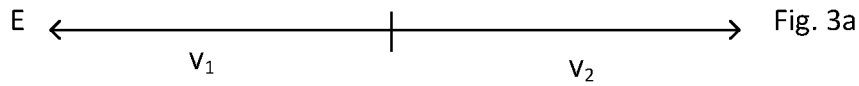
Figure 3:
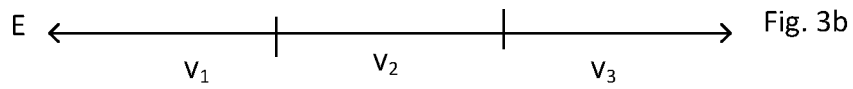
Figure 3:
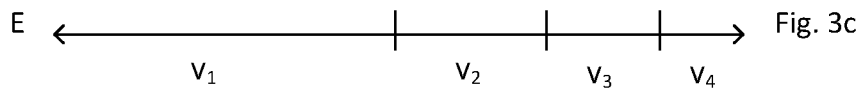

Shown in FIG. 3 are possible examples for the specification of individual value ranges for an apparatus 1 of the invention, or fora method of the invention. For the examples of FIGS. 3a and 3b, two $v_1$, $v_2$, or three equally long value ranges $v_1$-$v_3$, were predetermined for the influencing variable IV. In the case of FIG. 3c, in contrast, four differently large value ranges $v_1$-$v_4$ were predetermined. The value ranges v are, in such case, preferably predetermined, or correspondingly selected, as a function of the influence IV on the duration of operation t of the apparatus 1. It is then, for example, an option, to make for each of the value ranges v, in each case, a statement with reference to apparatus 1, or, for at least one of the value ranges v, a weighting factor can be specified. Then it is, in turn, possible to make the statement concerning the apparatus based on the at least two value ranges $v_1$, $v_2$ for the influencing variable IV and based on the at least one weighting factor.

Another option for additional embodiments is obtained by specifying differently many value ranges v for the different modules 3, 4 of the apparatus 1, or different value ranges v for different influencing variables IV. The different statements can, in such case, be ascertained in a single calculating unit 6 or in a plurality of processing units 6, 8.

It is to be noted here that for the embodiments shown in FIG. 1-FIG. 3 instead of statements concerning the entire apparatus 1 also different statements can be made for different modules, for example, an electronics unit 4 or a sensor unit 3.

Figure 4:
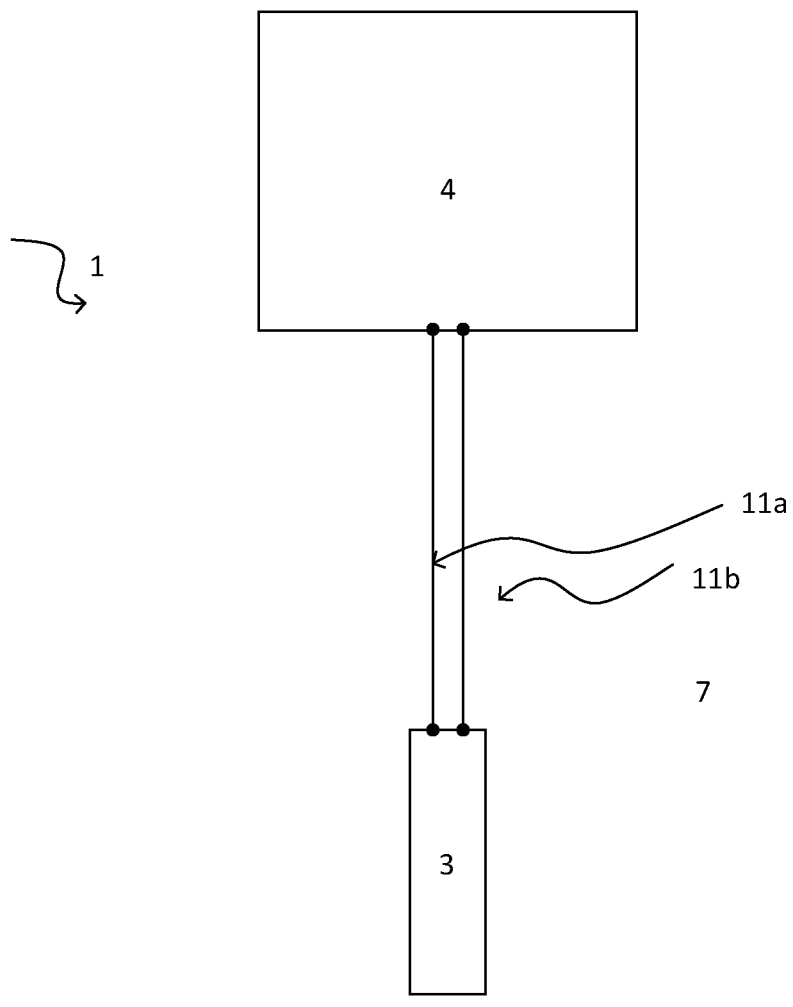

FIG. 4 shows another example of an embodiment of the present invention with an apparatus in the form of a thermometer 1. Thermometer 1 includes a sensor unit 3 in the form of a resistance element, which is connected with the electronics unit 4 via two connection lines 11a, 11b. In other embodiments, for example, also a sensor element 3 with a thermocouple can be used. In principle, all sensor units 3 known from the state of the art and used in connection with thermometers 1 can be put to use.

For the example of an embodiment shown in FIG. 4, the temperature T of the medium is both the process variable P as well as also the influencing variable IV. Correspondingly, no separate measuring unit 7 is needed for the apparatus 1 of FIG. 4.

Usually in the case of thermometers 1, different maximum temperatures are permitted for the sensor unit 3 and for the electronics unit 4. An operating of the particular module, thus, the sensor unit 3, or the electronics unit 4, at relatively high temperatures T, i.e. at temperatures near the maximum allowable operating temperature, leads to an increased probability for occurrence of defects in the particular modules 3,4, or can make a replacement of the particular module necessary at an earlier point in time than in a case, in which the thermometer 1 is operated only at lower temperatures T. Thus, the temperature T of the medium represents an influencing variable IV influencing the duration of operation t of the apparatus 1. In the context of the present invention, for the entire apparatus 1, or separately for different modules 3, 4 and/or for different value ranges, a statement can be made in each case. Or, weighting factors can be ascertained for the different modules 3, 4 and/or value ranges. Based on the different statements or based on the individual statements and the corresponding weighting factors, then, for example, a process specific duration of operation $t_p$ can be ascertained for one of the modules 3, 4 or for the apparatus 1.

Advantageously, the present invention enables a reliable and exact condition monitoring based on the duration of operation t of the apparatus and based on at least one influencing variable influencing the duration of operation t.

The invention claimed is:

1. An apparatus for determining and/or monitoring at least one process variable of a medium, comprising:
   a sensor unit for registering a value for the at least one process variable, wherein the sensor unit is embodied as a first module of the apparatus and is further embodied to come at least partially and at least at times in contact with the medium during the determining and/or monitoring of the at least one process variable;
   an electronics unit serving for signal registration, evaluation, and/or feeding, wherein the electronics unit is embodied as a second module of the apparatus;
   an operating hours counter for registering a duration of operation of the apparatus, wherein the operation hours counter is embodied to accumulate a total duration of operation;
   a measuring unit for registering a value of an influencing variable, wherein the measuring unit is one of the following:
      an apparatus for determining a temperature,
      an apparatus for determining a pressure,
      an apparatus for determining moisture content,
      an apparatus for detecting vibrations,
      an apparatus for determining a flow,
      an apparatus for determining a pH value, and
      an apparatus for determining a conductivity,
      wherein the measuring unit is either a unit separate from the sensor unit or part of the sensor unit, and wherein the influencing variable is a process parameter of the medium, the at least one process variable of the medium, or an environmental parameter; and
   a calculating unit embodied to make at least one statement with reference to a condition of at least one component of the apparatus, wherein the at least one statement is based on the duration of operation registered by the operating hours counter and on the influencing variable, wherein the influencing variable is influencing a condition of the apparatus, including an achievable lifetime of the apparatus,
   wherein the process parameter, the at least one process variable, and the environmental parameter is one of the following:
      a temperature of the process or of a component of the apparatus,
      a pressure, including a pressure in a container in which the medium is located,
      a moisture content, including a humidity of a surrounding of the apparatus,
      vibrations which occur in a region of the apparatus,
      a flow of the medium,
      a pH value of the medium; and
      a conductivity of the medium,
   wherein:
      the calculating unit is embodied to make a first statement with reference to a condition of the sensor unit of the apparatus and a second statement with reference to a condition of the electronics unit of the apparatus based on the duration of operation registered by the operating hours counter and on the influencing variable, or
      two calculating units are present, wherein a first calculating unit is embodied to make the first statement with reference to a condition of the sensor unit of the apparatus, and wherein a second calculating unit is embodied to make the second statement with reference to a condition of the electronics unit of the apparatus.

2. The apparatus as claimed in claim 1, further comprising:
   a display unit for a visual display of the at least one statement with reference to a condition of the component of the apparatus.

3. A method for operating an apparatus for determining and monitoring at least one process variable of a medium, comprising:
   providing the apparatus, including:
      a sensor unit for registering a value for the at least one process variable, wherein the sensor unit is embodied as a first module of the apparatus and is further embodied to come at least partially and at least at times in contact with the medium during the determining and/or monitoring of the at least one process variable;
      an electronics unit serving for signal registration, evaluation, and/or feeding, wherein the electronics unit is embodied as a second module of the apparatus;
      an operating hours counter for registering a duration of operation of the apparatus, wherein the operation hours counter is embodied to accumulate a total duration of operation;
      a measuring unit for registering a value of an influencing variable, and wherein the measuring unit is one of the following:
         an apparatus for determining a temperature,
         an apparatus for determining a pressure,
         an apparatus for determining moisture content,
         an apparatus for detecting vibrations,
         an apparatus for determining a flow,
         an apparatus for determining a pH value, and
         an apparatus for determining a conductivity,
         wherein the measuring unit is either a unit separate from the sensor unit or part of the sensor unit, and wherein the influencing variable is a process parameter of the medium, the at least one process variable of the medium, or an environmental parameter; and
      a calculating unit embodied to make at least one statement with reference to a condition of at least one component of the apparatus, wherein the at least one statement is based on the duration of operation registered by the operating hours counter and on the influencing variable, wherein the influencing variable is influencing a condition of the apparatus, including an achievable lifetime of the apparatus,
      wherein the process parameter, the at least one process variable and the environmental parameter is one of the following:
         a temperature of the process or of a component of the apparatus,
         a pressure, including a pressure in a container in which the medium is located, a moisture content, including a humidity of a surrounding of the apparatus,
vibrations which occur in a region of the apparatus,
a flow of the medium,
a pH value of the medium, and
a conductivity of the medium,
wherein:
the calculating unit is embodied to make a first statement with reference to a condition of the sensor unit of the apparatus and a second statement with reference to a condition of the electronics unit of the apparatus based on the duration of operation registered by the operating hours counter and on the influencing variable, or
two calculating units are present, wherein a first calculating unit is embodied to make the first statement with reference to a condition of the sensor unit of the apparatus, and wherein a second calculating unit is embodied to make the second statement with reference to a condition of the electronics unit of the apparatus;
registering a value for the at least one process variable;
registering the duration of operation; and
making at least one statement with reference to the condition of the at least one component of the apparatus, wherein the statement is made at least based on the registered duration of operation and based on the at least one influencing variable.

4. The method as claimed in claim 3,
wherein the at least one statement includes a statement with reference to the condition of the at least one component of the apparatus that is a process specific duration of operation of the at least one component of the apparatus.

5. The method as claimed in claim 3,
wherein the at least one statement includes a statement with reference to the condition of the at least one component of the apparatus that is a probability for occurrence of a defect or a failure of the at least one component of the apparatus.

6. The method as claimed in claim 3,
wherein the at least one statement is a statement with reference to the condition of the at least one component of the apparatus that is a loading of the at least one component of the apparatus.

7. The method as claimed in claim 3,
wherein the at least one statement includes a statement with reference to a condition of an additional apparatus that serves for monitoring the medium.

8. The method as claimed in claim 3, further comprising:
predetermining a first value range and a second value range for the influencing variable;
determining a first value for a duration of operation of the apparatus within the first value range and a second value for a duration of operation of the apparatus within the second value range; and
making a statement with reference to at least one component of the apparatus for each of the first value range and the second value range.

9. The method as claimed in claim 8, further comprising:
specifying a weighting factor for at least one of the first value range and the second value range for the influencing variable,
wherein the statement with reference to the at least one component of the apparatus is based on the first value range and second value range for the influencing variable and based on the weighting factor.

* * * * *